United States Patent
Palomino

(10) Patent No.: US 10,133,020 B2
(45) Date of Patent: Nov. 20, 2018

(54) BORESIGHT ALIGNMENT MODULE

(71) Applicant: RAYTHEON COMPANY, Waltham, MA (US)

(72) Inventor: Steven C. Palomino, McKinney, TX (US)

(73) Assignee: RAYTHEON COMPANY, Waltham, MA (US)

( * ) Notice: Subject to any disclaimer, the term of this patent is extended or adjusted under 35 U.S.C. 154(b) by 54 days.

(21) Appl. No.: 14/926,201

(22) Filed: Oct. 29, 2015

(65) Prior Publication Data

US 2017/0123177 A1    May 4, 2017

(51) Int. Cl.
| | | |
|---|---|---|
| G02B 7/00 | (2006.01) | |
| G02B 5/20 | (2006.01) | |
| G02B 27/30 | (2006.01) | |
| G02B 5/04 | (2006.01) | |
| G02B 27/14 | (2006.01) | |
| G02B 5/122 | (2006.01) | |

(Continued)

(52) U.S. Cl.
CPC .............. *G02B 7/003* (2013.01); *G02B 5/04* (2013.01); *G02B 5/122* (2013.01); *G02B 5/20* (2013.01); *G02B 26/108* (2013.01); *G02B 27/1006* (2013.01); *G02B 27/14* (2013.01); *G02B 27/141* (2013.01); *G02B 27/30* (2013.01)

(58) Field of Classification Search
CPC . G02B 7/003; G02B 5/04; G02B 5/20; G02B 5/122; G02B 5/124; G02B 5/128; G02B 27/30; G02B 27/141; G02B 27/144; G02B 27/143; G02B 26/16; G02B 26/108; G02B 27/14; G02B 27/1006; G01S 17/42; G01S 17/66; G01S 3/783; G01S 3/784; G01B 11/26; G01B 11/27; F41G 3/326; G01C 17/00
USPC .............. 359/529, 537, 528, 629, 638, 636; 356/152.1, 152.2, 153, 141.1, 141.2, 356/141.5, 142, 138; 250/342, 201.9, 250/206.1, 203.2, 206.2
See application file for complete search history.

(56) References Cited

U.S. PATENT DOCUMENTS

| | | |
|---|---|---|
| 4,422,758 A | 12/1983 | Godfrey et al. |
| 4,649,274 A * | 3/1987 | Hartmann .............. G02B 23/04 250/252.1 |

(Continued)

OTHER PUBLICATIONS

International Search Report and Written Opinion from corresponding PCT Application No. PCT/US2016/032744 dated Aug. 4, 2016.

*Primary Examiner* — Jie Lei
(74) *Attorney, Agent, or Firm* — Lando & Anastasi, LLP

(57) ABSTRACT

A boresight module includes a housing including an input window and an exit window. The boresight module further includes a lateral transfer hollow, dichroic beam splitter, retro-reflector (LTHSR) assembly supported by the housing. The LTHSR assembly includes a dichroic beam splitter. The boresight module further includes a corner cube coupled to the housing and a collimator including a collimator housing coupled to the housing and a target supported by the collimator housing. The target is configured to receive electromagnetic radiation from the input window to emit electromagnetic radiation through the exit window. A method of aligning a device with a boresight alignment module is further disclosed.

9 Claims, 14 Drawing Sheets

(51) Int. Cl.
  *G02B 27/10*   (2006.01)
  *G02B 26/10*   (2006.01)

(56) References Cited

U.S. PATENT DOCUMENTS

| | | | |
|---|---|---|---|
| 4,798,462 A * | 1/1989 | Byren | G01B 11/27 |
| | | | 356/139.08 |
| 5,054,917 A | 10/1991 | Pepin et al. | |
| 5,080,483 A | 1/1992 | Cook | |
| 2003/0174315 A1 | 9/2003 | Byren et al. | |
| 2011/0103410 A1 * | 5/2011 | Hutchin | F41H 13/0062 |
| | | | 372/9 |

* cited by examiner

BORESIGHT ALIGNMENT MODULE

BACKGROUND OF THE DISCLOSURE

The boresight between a laser and a return receiving optical system and cameras/detectors is important for alignment of sensors used for large standoff ranges. The ability to accomplish precise alignment verification while on-station enhances the ability to acquire and track (for example) far away targets. However, establishing and maintaining true alignment (in the operational environment) of a typical boresight alignment module can be a very difficult task. In addition, ensuring proper alignment between a boresight module and a transmit/receive sensor unit can also be problematic, resulting in potential alignment errors. A relatively forgiving boresight module that would allow for accurate boresighting is needed.

One known method uses a set of parallel mirrors creating a prism to accomplish boresight alignment. There have been issues with self-alignment and alignment with the transmit/receive sensor unit. Alignment over the entire operational environment is unverified. Moreover, errors have been difficult to trace. Another method uses a lateral transfer hollow retro-reflector (LTHR) and a light source to establish boresighting. This solution uses a light source separate from the laser itself, which introduces undesirable errors and is not as accurate as using the laser itself as a reference. In order to target, track, and range at long standoff ranges the sensors and laser need to be extremely well aligned in object space.

SUMMARY OF THE DISCLOSURE

One aspect of the present disclosure is directed to a boresight module comprising a housing including an input window and an exit window. The boresight module further comprises a lateral transfer hollow, dichroic beam splitter, retro-reflector (LTHSR) assembly supported by the housing. The LTHSR assembly includes a dichroic beam splitter. The boresight module further includes a corner cube coupled to the housing and a collimator including a collimator housing coupled to the housing and a target supported by the collimator housing. The target is configured to receive electromagnetic radiation from the input window to emit electromagnetic radiation through the exit window.

Embodiments of the boresight module further may include configuring the dichroic beam splitter to have one highly-transmissive (HT) surface in all wavelengths and one surface with a 50/50 transmission/reflection for laser wavelength. The LTHSR assembly further may include an attenuating beam splitter disposed between the input window and the dichroic beam splitter. The electromagnetic radiation may travel the one of the two beam splitters to the exit window. The module further may include a first Risley prism pair supported housing proximate to the exit window. The exit window may include a pair bandpass filters positioned proximate to the first Risley prism pair. The collimator further may include a second Risley prism pair supported by the collimator housing. The module further may include at least one beam dump. The LTHSR assembly further may include a roof prism. The input window may be monochromatic. The corner cube may include at least two mirrors. A laser beam may enter the input window, travel to one of the two beam splitters, and be received at least in part by a beam dump. The module further may include a relief valve. The electromagnetic radiation may span the visible, mid-wave and long-wave regions of the electromagnetic spectrum. A combination of components may be arranged in the module to create a device that is substantially thermally insensitive.

Another aspect of the present disclosure is directed to a method of aligning a device with a boresight alignment module. In one embodiment, the method comprises: receiving an electromagnetic radiation through an input window of a lateral transfer hollow, dichroic beam splitter, retro-reflector (LTHSR) housing; transmitting part of the electromagnetic radiation through a dichroic beam splitter; reflecting the transmitted part of the electromagnetic radiation off of a corner cube; reflecting the electromagnetic radiation off of a second side of the dichroic beam splitter into a collimator subsequent to being reflected off of the corner cube; focusing the electromagnetic radiation on a target by the collimator; emitting electromagnetic radiation by the target in response to the electromagnetic radiation; transmitting part of the electromagnetic radiation through the dichroic beam splitter; and receiving the transmitted part of the electromagnetic radiation by one of the plurality of sensors.

Embodiments of the method further may include reflecting part of the electromagnetic radiation off of a first side of a dichroic beam splitter. The method further may include receiving the reflected part of the electromagnetic radiation by one of a plurality of sensors through an exit window. The input window may monochromatically filter the electromagnetic radiation. The electromagnetic radiation may be partially reflected by an attenuating beam splitter before reaching the dichroic beam splitter. The partially reflected electromagnetic radiation may be directed to strike a beam dump. The electromagnetic radiation may be directed to reach the attenuating beam splitter by way of a roof prism. The first side of the dichroic beam splitter and the second side of the dichroic beam splitter may be parallel to one another. The electromagnetic radiation may be filtered by a pair of bandpass filters at the exit window. The electromagnetic radiation may span the visible, mid-wave and long-wave regions of the electromagnetic spectrum. The electromagnetic radiation may be emitted in response to the heating of the target by the electromagnetic radiation. The electromagnetic radiation may be partially transmitted through the dichroic beam splitter has a direction of travel parallel to the electromagnetic radiation reflected off of the first side of the dichroic beam splitter. The electromagnetic radiation may be filtered by the pair of bandpass filters at the exit window.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

DETAILED DESCRIPTION OF THE PREFERRED EMBODIMENTS

Figure 1:
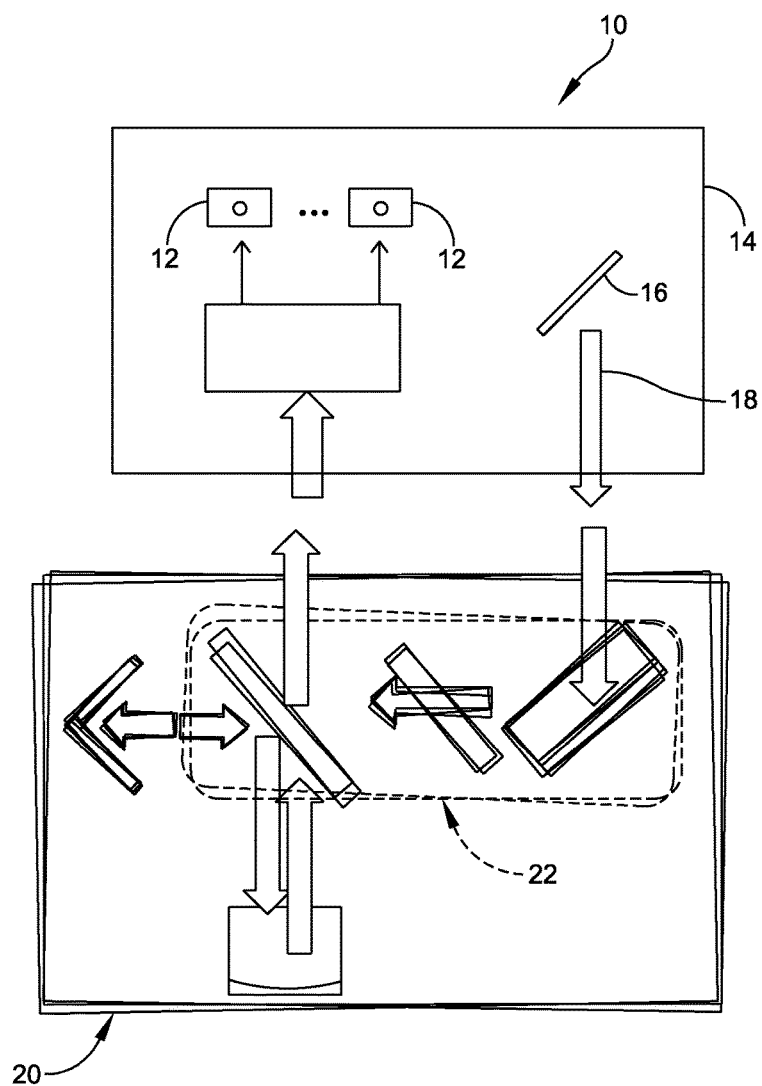
FIG. 1 is a schematic view of a boresight alignment module of an embodiment of the present disclosure used to align a laser sensor system.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

As described above, establishing and maintaining true alignment of a boresight module is a difficult but integral task in order to acquire and track far away targets. Accordingly, a robust and forgiving boresight module that can perform alignment to the transmit/receive sensor unit while on-station is needed. It is desirable that the boresight module maintain an alignment of the boresight module even under intense in-field conditions, including but not limited to intense vibrations and rapid thermal fluctuations.

Therefore, embodiments described herein provide a bolt-together boresight module that can be used to co-align a laser and receiving detectors to very tight tolerances.

In one embodiment, a boresight alignment module includes a lateral transfer hollow, dichroic beam splitter, retro-reflector ("LTHSR"), a corner cube, and a collimator. A typical lateral transfer hollow retro-reflector ("LTHR") consists of three minors, two in the form of a roof prism and a third positioned away at a right angle to both minors in the roof prism. The LTHSR has an optional attenuator in between and a special dichroic beam splitter in place of the third minor. In a certain embodiment, the dichroic beam splitter is a dichroic mirrored prism assembly that uses dichroic optical coatings to divide an incoming light beam into a number of spectrally distinct output beams. The dichroic beam splitter has one highly-transmissive (HT) surface in all wavelengths and one surface with a 50/50 transmission/reflection for the laser wavelength. Since management of the laser energy is critical, the LTHSR also includes an intermediate beam splitter used for attenuating the laser energy. This design enables an angle-in of electromagnetic radiation (e.g., laser energy) equals angle-out with fairly simple alignment. One beam splitter directs most of the laser energy into a beam dump. The remaining laser energy is split with a portion going into the sensor and the rest hitting a corner-cube and directed into the collimator. The collimator focuses the remaining laser energy onto a target (e.g., a KG-3 target) so that the heated target emits Vis/MW/LW and re-emits a small amount of laser energy. This energy is then expanded by the collimator, going once again through the dichroic beam splitter so that the spot on the KG-3 can be imaged and seen by the appropriate detectors in the receiver. By utilizing the LTHSR, the corner cube, and the collimator in a proper configuration, it is possible to fabricate a bolt-together boresight alignment module that can be used to co-align a laser and receiving detectors to very tight tolerances.

Referring to drawings, and more particularly to FIG. 1, a boresighting system, generally indicated at 10, can be used to align a sensor. Typically, an imager, such as one or more cameras, each indicated at 12 in FIG. 1, are used to align a device 14, such as the sensor. As shown, any number of cameras may be employed. The boresighting system 10 includes a boresight module, generally indicated at 20. To perform alignment, a laser beam or laser energy (referred to herein collectively as "electromagnetic radiation") is received by a steering mirror 16 of the device 14. The steering mirror 16 is capable of moving to adjust a path 18 of the electromagnetic radiation, such as the laser beam, in order to align the received beam by the cameras 12 to obtain alignment with a system "zero" location. The electromagnetic radiation is fed into the boresight module 20 along path 18, the boresight module including three primary components—a LTHSR assembly 31, a corner cube generally indicated at 24, and a collimator generally indicated at 26. The arrangement is such that a stable laser beam that enters the boresight module 20 and an exit beam that exits the boresight module 20 along path 18 remain parallel, even if the boresight module 20 and the components therein are moving. The components in the LTHSR assembly 31 remain fixed with respect to one another, particularly a roof prism and a dichroic beam splitter, which will be discussed in greater detail below.

Figure 2A:
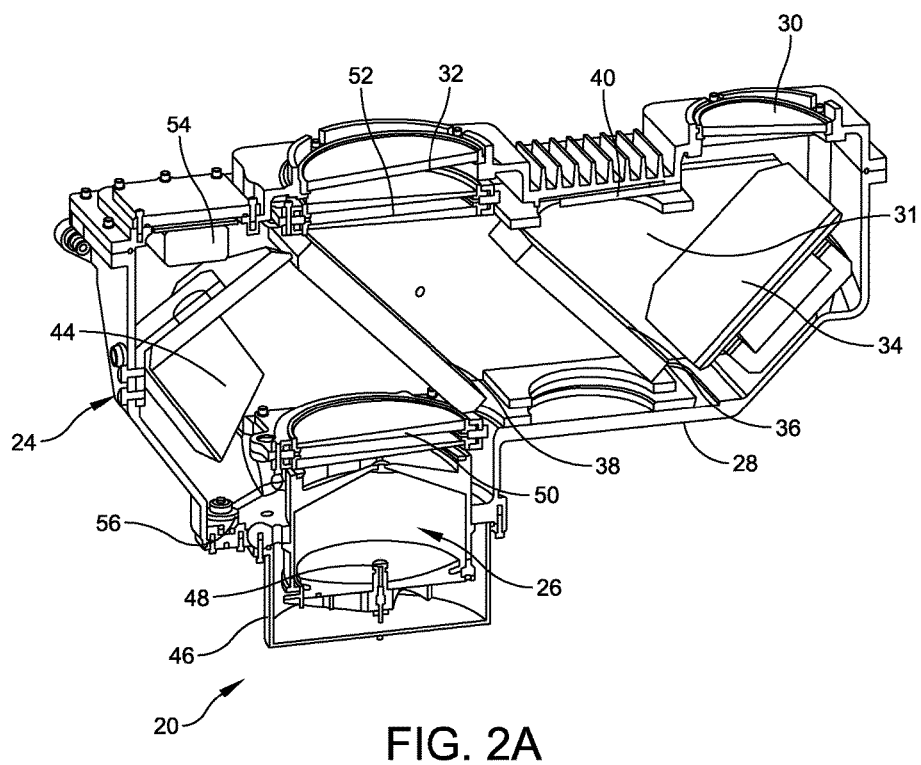
FIG. 2A is a perspective sectional view of the boresight alignment module.
Figure 2B:
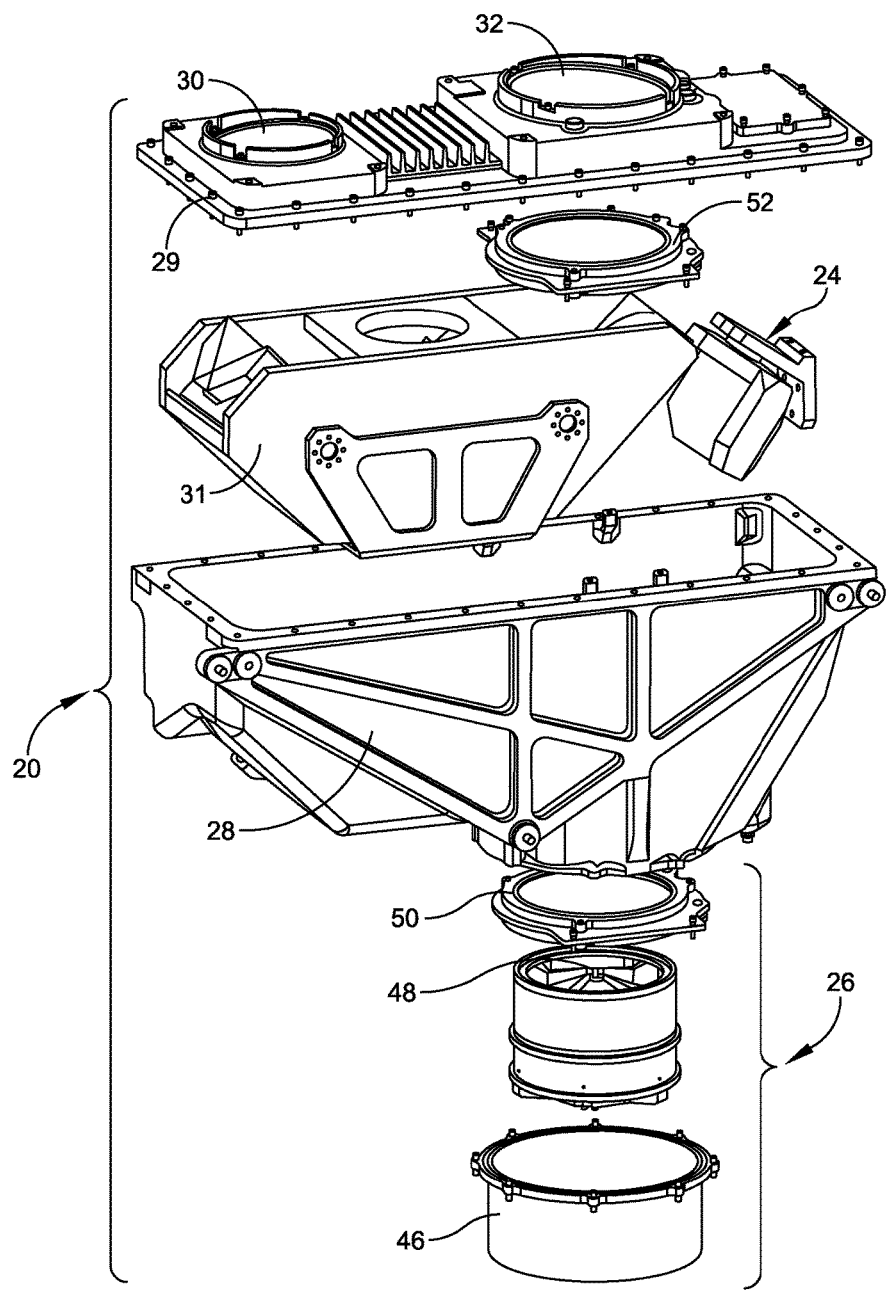
FIG. 2B is an exploded perspective view of the boresight alignment module.

Referring to FIGS. 2A and 2B, the boresight module 20 includes a housing 28 and a cover 29, forming part of the housing, having an input window 30 and an exit window 32. The boresight module further includes the LTHSR assembly 31 that is configured to support a roof prism 34, an optional beam splitter 36, and a dichroic beam splitter 38 within its assembly. The LTHSR assembly 31, the corner cube 24 and the collimator 26 are secured to one another via the housing 28 at standard machine tolerances using standard hardware. The combination of the LTHSR assembly 31, the corner cube 24, and the collimator 26 form the heart of the device, working together so as to maintain parallelism between the incoming beam and the reflections both up and down off of the reflective surface of the dichroic beam splitter. The up reflection is directly from a laser and the down reflection enters the collimator 26 as a reflection back from the corner cube 24. The collimator 26 then focuses the energy onto a target that emits the desired wavelengths after absorbing the laser wavelength (e.g. a KG-3 target for 1 µm light). The emitted wavelengths are expanded by the collimator 26 and are transmitted back up through the dichroic beam splitter 38 and are parallel to the incoming and direct-reflection beam paths. The exit window and other (optional) elements can act as attenuators at the laser wavelength, specified as required to protect the absorbing target and the detectors in the sensor being aligned.

In one embodiment, the collimator 26 is a device that will focus collimated light onto a point and vice-versa, expand a point target at the focus to a collimated bundle of light. The collimator 26 may include a light source at its focus and can be used to replicate a target at infinity without parallax. Optical collimators can be used to calibrate other optical devices, to determine whether all elements of the optical device are aligned on an optical axis, to set elements of the device at a proper focus, or to align two or more devices. The collimator 26 further includes a target 48, such as a KG-3 target, which is supported by the housing 46. The collimator 26 is configured to focus the remaining electromagnetic radiation, e.g., laser energy, onto the KG-3 target 48 so that the heated target emits visible, mid-wave infrared and long-wave infrared light in addition to a small amount of re-emitted laser light. In one embodiment, the KG-3 target 48 of the collimator 26 can be a Lambertian reflector/absorber, and can be used to capture the contents of the electromagnetic radiation substantially instantaneously as the target rapidly heats up in response to the incident electromagnetic radiation. This heated "spot" defined by the target 48 will then emit the aforementioned portions of the electromagnetic spectrum. The electromagnetic radiation is then expanded by the collimator 26, traveling through the dichroic beam splitter 38 so that the spot on the KG-3 target 48 can be imaged and seen by detectors in the cameras 12. By utilizing the LTHSR assembly 31, the corner cube 24, and the collimator 26 in a proper configuration, it is possible to fabricate a bolt-together boresight alignment module 20 that can be used to co-align a laser and receiving detectors to very tight tolerances.

The boresight module 20 also contains a number of ancillary components in the shown embodiment. For example, the electromagnetic radiation enters the boresight module 20 through the monochromatic input window 30 that will only allow the intended electromagnetic radiation to enter the boresight module. The input to the collimator 26 may, if needed, also contain a Risley prism pair 50, which is an optics device capable of deflecting an incident beam by a range of a few milliradians. Another optional Risley prism pair 52 is positioned within the housing 28 of the LTHSR assembly 31 proximate to the exit window 32, through which the electromagnetic radiation exits the boresight module 20. The Risley prism pair 52 associated with the LTHSR assembly 31 serves the same purpose as the Risley prism pair 50 associated with the collimator 26. The boresight module 20 also contains desiccant 54, which is a hygroscopic substance that absorbs water in a vicinity of the desiccant to create a state of dryness around the desiccant, and a relief valve 56 used to alleviate excess pressure in the boresight module as needed.

Figure 3:
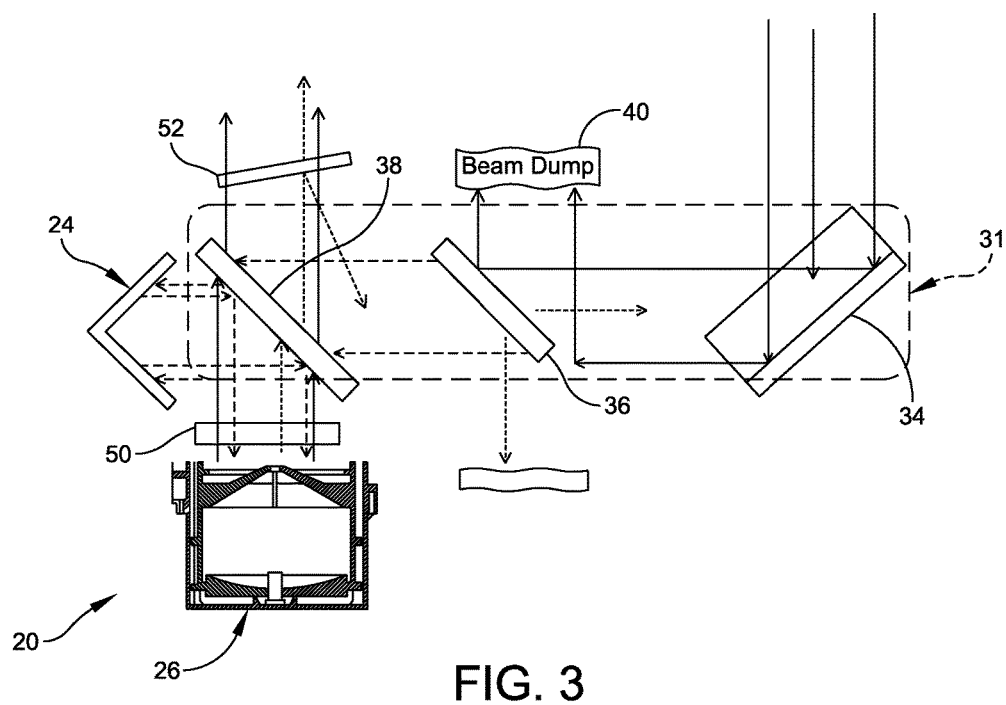
FIG. 3 is a schematic view of the boresight alignment module showing energy paths during use.

Referring to FIG. 3, an electromagnetic radiation path through the boresight module 20 is shown. As shown, the path of the electromagnetic radiation as it enters the LTHSR assembly 31 is described below in detail with reference to FIGS. 6-13. In one embodiment, the power of the electromagnetic radiation entering the boresight module 20 is approximately 10 Watts (W).

Figure 4:
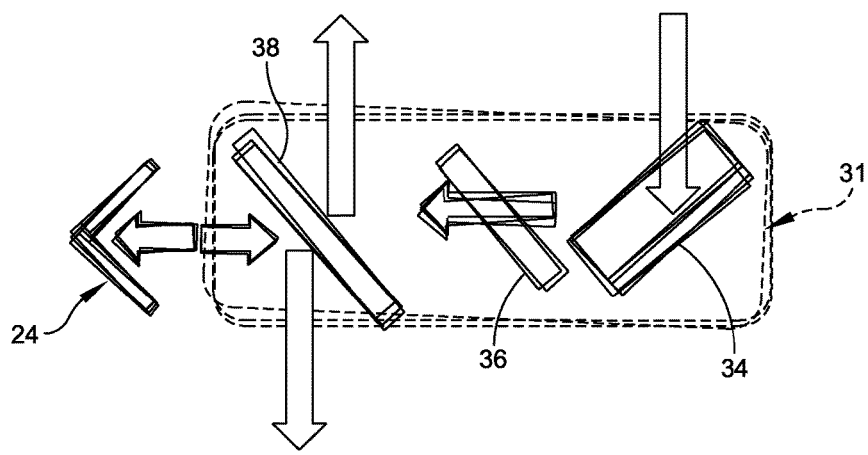
FIG. 4 is a schematic view of the boresight alignment module showing conversion of angle between an input beam and beams reflected off components of the boresight alignment module.

Referring to FIG. 4, the electromagnetic radiation is transmitted laterally and vertically, within the boresight module 20 using the orientation scheme of FIG. 3 by way of example only, such that all of the electromagnetic radiation and laser energy exiting through the exit window 32 is substantially parallel to each other and antiparallel to the incoming electromagnetic radiation entering through the input window 30. FIG. 4 illustrates that a stable laser beam and an exit beam(s) reflecting off both sides 38a, 38b of the dichroic beam splitter 38 remain parallel, even if the LTHSR assembly 31 and the corner cube 24 are moving with respect to each other. The components of the LTHSR assembly 31 remain fixed with respect to one another, particularly the roof prism 34 and the dichroic beam splitter 38.

Figure 5:
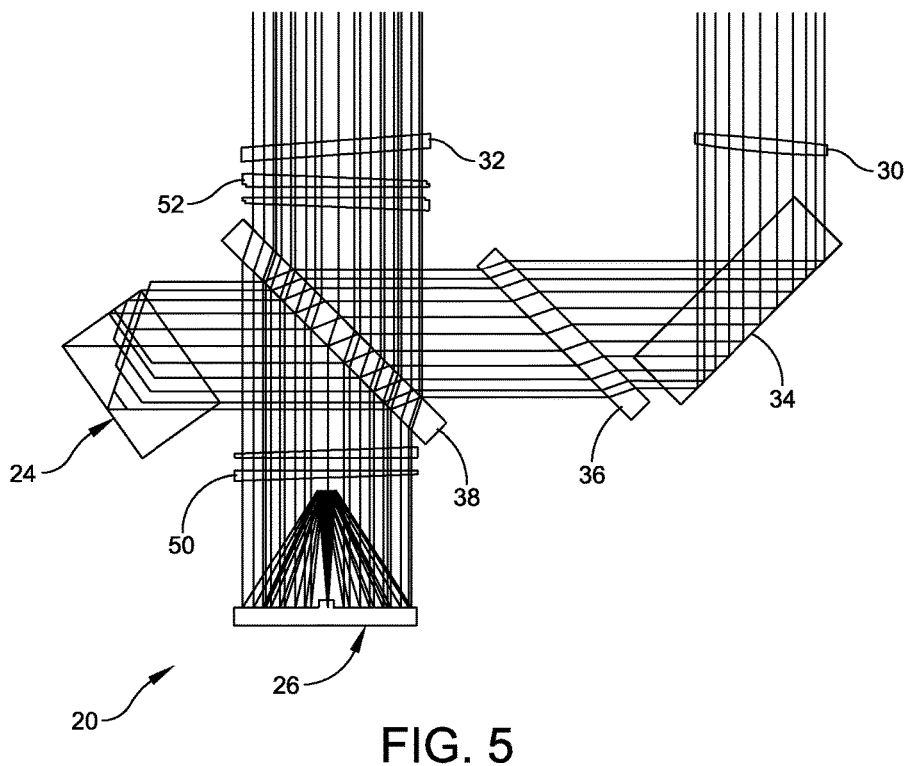
FIG. 5 is a schematic view of a lateral transfer hollow, dichroic beam splitter, retro-reflector ("LTHSR"), a collimator, and a corner cube of the boresight alignment module during use.

FIG. 5 illustrates a density of electromagnetic energy as the electromagnetic radiation enters the LTHSR assembly 31 of the boresight module 20 and a portion of the energy that is converted to electromagnetic radiation by the collimator 26 and how the energy/light flows through the boresight module. In a preferred embodiment, a function of the collimator 26 is highlighted by the manner by which the collimator focuses the electromagnetic radiation on the KG-3 target 48 of the collimator. The distribution of the electromagnetic radiation in the preferred embodiment is more extensive than shown in the simplified depiction of FIG. 5.

Figure 6:
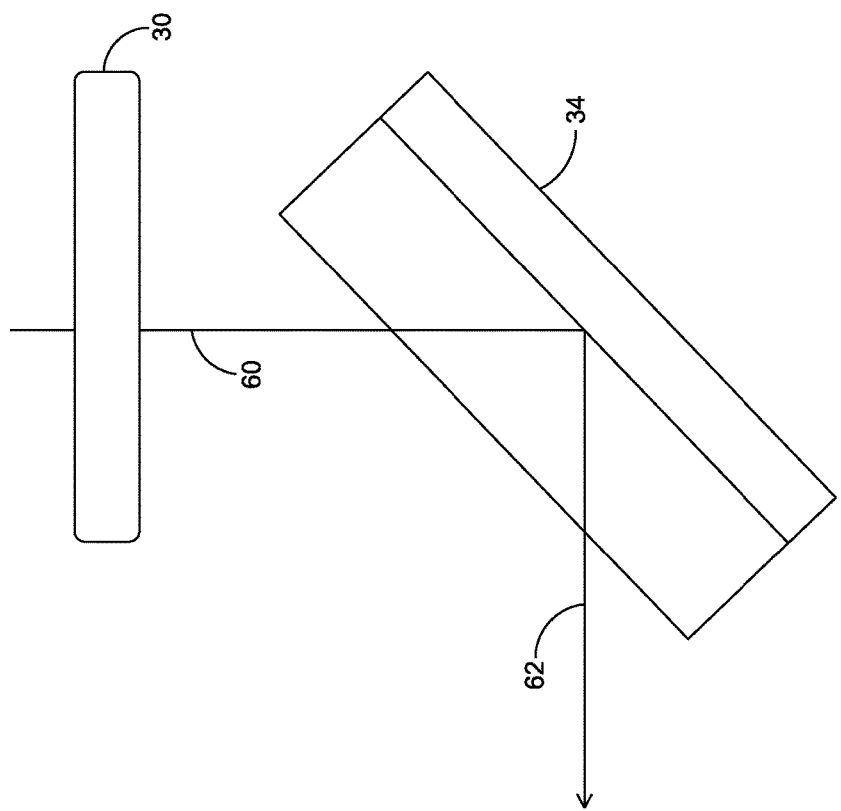
FIG. 6 is a schematic view of an input window and a roof prism of the boresight module.

Referring to FIG. 6, showing the entrance window and the first major component of the LTHSR assembly 31, the roof prism 34, laser radiation enters the housing of the LTHSR through the input window 30 along path 60. In a certain embodiment, the input window 30 is monochromatic, and selectively allows light from the intended laser radiation (for example, 1 micron) to pass into LTHSR housing 28. The monochromatic input window 30 further may be used to co-align two lasers of different wavelengths that share one aperture. The laser radiation falls incident upon the roof prism 34, and is reflected laterally through LTHSR housing 28 along path 62.

Figure 7:
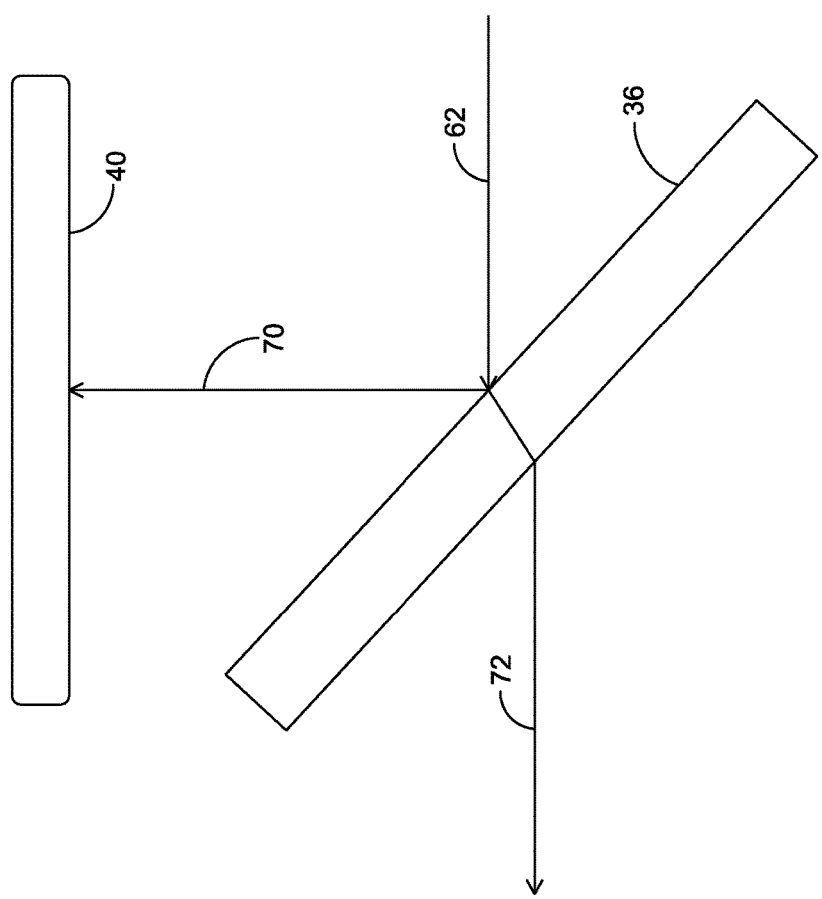
FIG. 7 is a schematic view of a beam splitter and a beam dump of the boresight module.

Illustrated in FIG. 7 is the optional attenuating beam splitter and beam dump, which could be incorporated into the LTHSR. In one embodiment the laser radiation from path 62 falls incident upon the attenuating beam splitter 36, subsequent to being reflected by the roof prism 34. Most of the energy is reflected to avoid damaging components of the sensor being aligned and the absorbing target in the collimator of the boresight module. It is therefore directed towards the beam dump along path 70, which absorbs the excess energy. A small portion of the laser radiation, roughly 2% of the electromagnetic radiation in one embodiment, is transmitted through the beam splitter 36 as a first transmitted laser radiation path 72, and emerges parallel to the laser radiation path 62.

Figure 8:
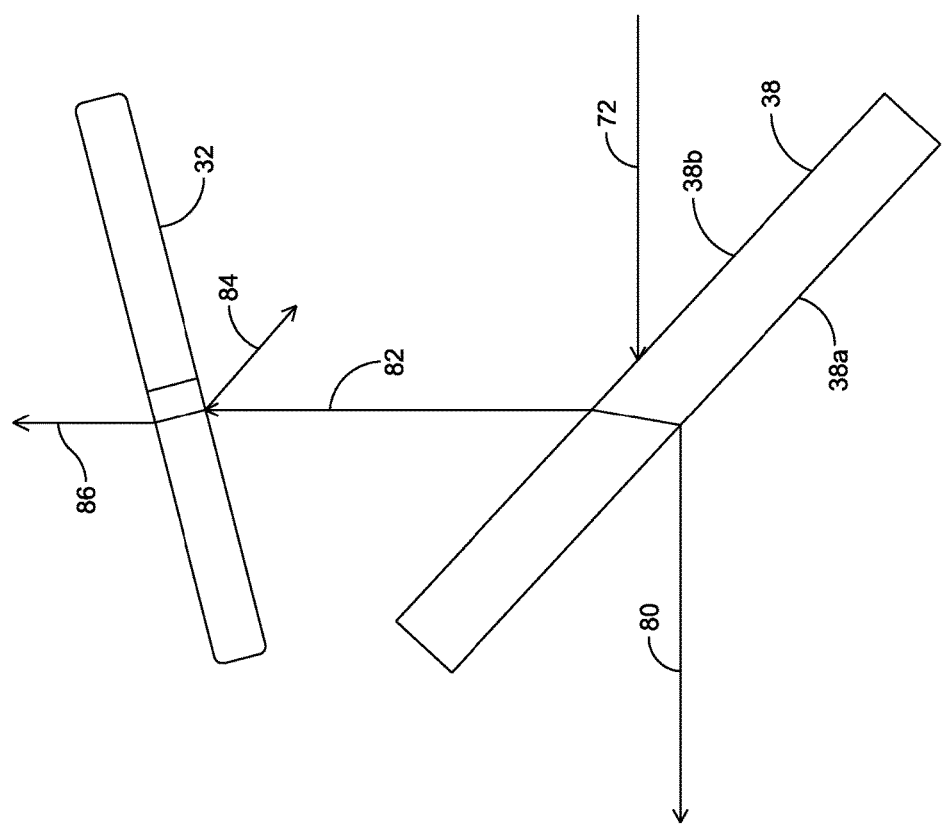
FIG. 8 is a schematic view of a dichroic beam splitter and an exit window of the boresight module.

Referring to FIG. 8, which shows the second major component of the LTHSR, the dichroic beam splitter has a 50/50 at the laser wavelength (1 micron in one embodiment) coating on one side 38a and a broadband anti-reflective coating on the other 38b. Subsequent to emerging from the beam splitter 36, the first transmitted laser radiation path 72 from the beam splitter falls incident upon the dichroic beam splitter 38. In one embodiment, the energy passes through the AR-coated first surface 38b propagating to the 50/50 dichroic beam splitter second surface 38a. Half of the first transmitted laser radiation path 72 is transmitted past the dichroic beam splitter 38 emerging as a second transmitted laser radiation path 80, which is parallel to the first laser radiation path 72. Half of the first transmitted laser radiation path is directed to the dichroic beam splitter 38 along path 72 is reflected off of the dichroic beam splitter, travels through the optical material and refracts back into air along path 82, parallel to the incoming path 60, and falls incident upon the exit window 32, which in one embodiment may contain a pair of bandpass filters (not pictured) that selectively passes, attenuates, and blocks the wavelengths of concern. The amount of laser radiation that passes through the exit window 32 along path 86 as a third transmitted laser radiation path is controlled by the bandpass filters whose design is dependent on the sensitivity of the sensor cameras. Upon passing through the exit window 32, transmitted laser radiation path 86 is received by the cameras 12. The cameras 12 will use this transmitted laser radiation to properly co-align the laser radiation as compared with that of the receiving optical system, a process which is expanded upon below in reference to FIG. 13.

Figure 9:
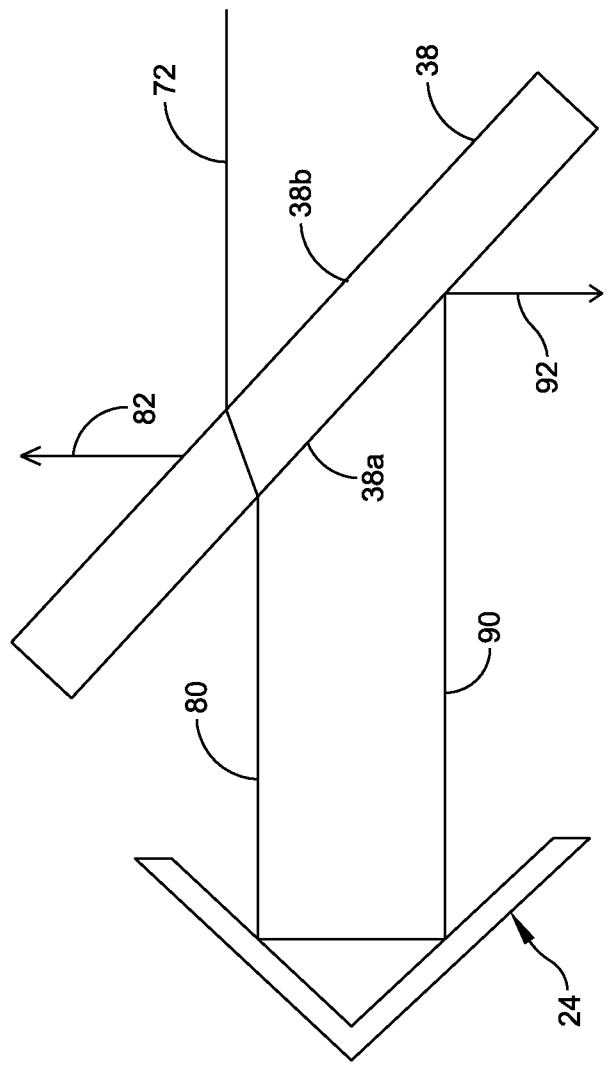
FIG. 9 is a schematic view of the corner cube and the dichroic beam splitter of the boresight module.

FIG. 9 illustrates the second transmitted laser radiation path 80 as the laser radiation emerges from dichroic beam splitter 38. The second transmitted laser radiation path 80 falls incident upon the corner cube 24 and is reflected by the corner cube along path 90, which is antiparallel to its original, incident path 80. The second transmitted laser radiation then falls incident along path 90 upon one side 38a of the dichroic beam splitter 38, and is reflected downward along path 92 in the orientation shown in FIG. 9, parallel to paths 86 and 60. (A dichroic is a special thin-film coating that passes electromagnetic radiation of a very small range on the electromagnetic spectrum, and in this case, the one side 38a of the dichroic beam splitter 38 allows only mid-wave infrared radiation to pass through and splits the 1 µm energy, passing 50% and reflecting 50% of the incident laser radiation.) The one side 38a of the dichroic beam splitter 38 is parallel to an opposite side 38b of the dichroic beam splitter, and will be explained in greater detail below.

Figure 10:
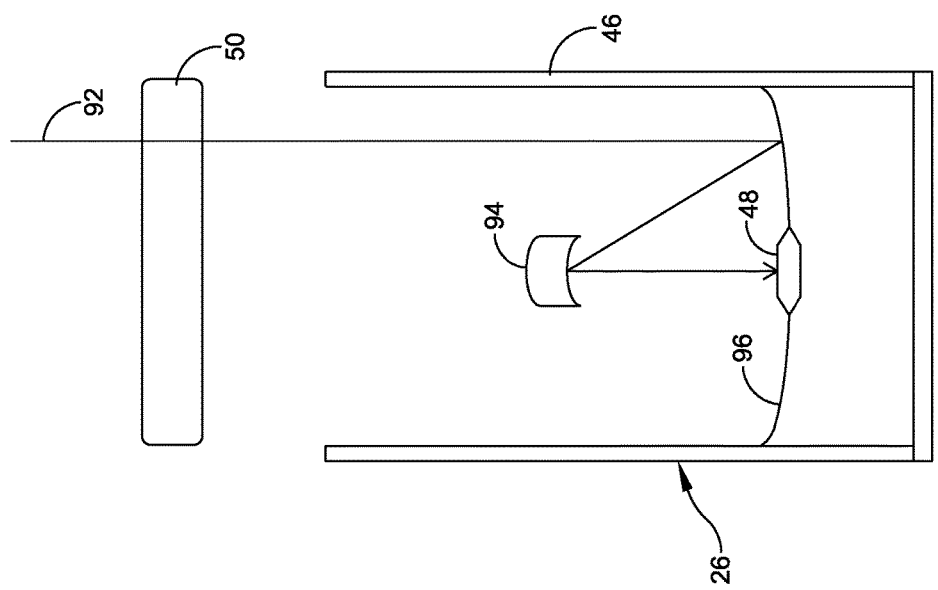
FIG. 10 is a schematic view of the collimator, a Risley prism pair and a target of the boresight module.

FIG. 10 traces the path of the second transmitted laser radiation as it is reflected by one side 38a of the dichroic beam splitter 38 along path 92 into the collimator 26. The second transmitted laser radiation path 92 passes through the optional Risley prism pair 50 (used to realign the electromagnetic radiation in case or some misalignment at some point in its path), and continues on to collimator 26. The collimator 26 includes two lenses 94, 96 that are responsible for focusing the incident laser radiation on the target 48. As mentioned above, in one embodiment, the target 48 is a KG-3 Lambertian reflector/absorber, and heats up extremely quickly in response to the incident electromagnetic radiation, such that the glass heats up substantially instantaneously. This heating process images a "spot" on the target 48, which then re-emits the energy as electromagnetic radiation spanning the visible, mid-wave and longwave regions of the electromagnetic spectrum. This electromagnetic radiation is fed to the cameras 12 for use in alignment. In order to reach the cameras 12, the electromagnetic radiation travels back along the same path 92 that the incident electromagnetic radiation traced until the electromagnetic radiation reaches the one side 38a of the dichroic beam splitter 38.

Figure 11:
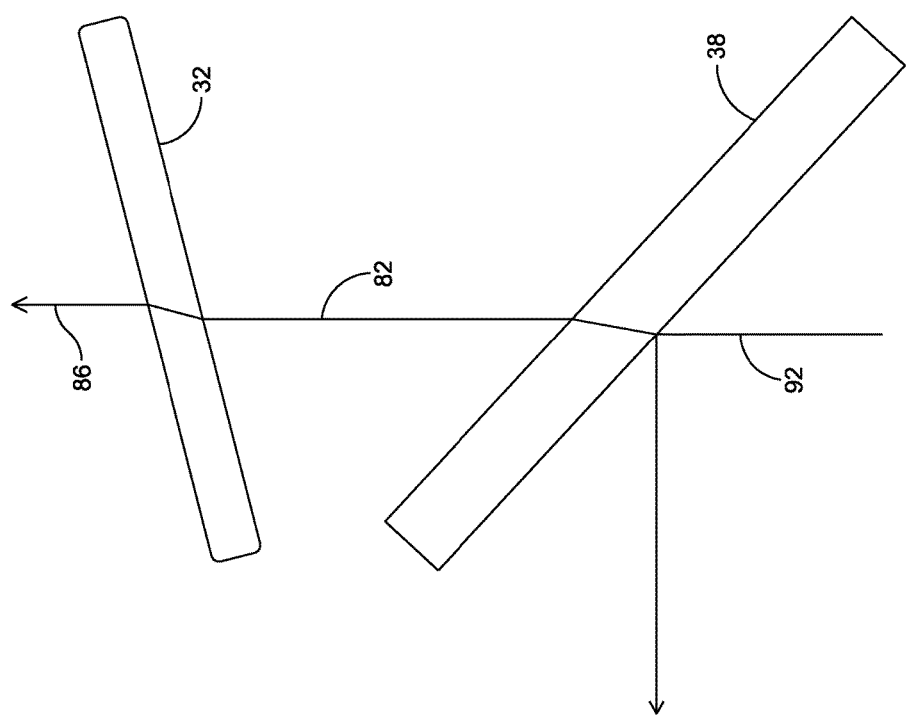
FIG. 11 is a schematic view of the dichroic beam splitter and the exit window of the boresight module.

Referring to FIG. 11, the incident electromagnetic radiation output by the target 48 is shown. As explained above, the dichroic beam splitter 38 selectively passes mid-wave infrared radiation and reflects 50% of the laser radiation (how it handles other wavelengths is optional). The transmitted mid-wave infrared radiation travels along path 82 and strikes the exit window 32, which, as explained above, may also consist of bandpass filter that selectively passes electromagnetic radiation in the mid-wave infrared region of the electromagnetic spectrum and attenuates the laser wavelength. Mid-wave infrared radiation is therefore allowed to pass through unattenuated along path 86, and emerges to be received by the cameras 12 for alignment. When mid-wave infrared radiation reaches the cameras 12, the direction of travel of the mid-wave infrared radiation is substantially parallel with that of the third transmitted electromagnetic radiation along path 86, and thus the incoming laser radiation along path 60, with the result that the mid-wave infrared radiation and the third transmitted electromagnetic radiation are co-aligned with each other.

Figure 12:
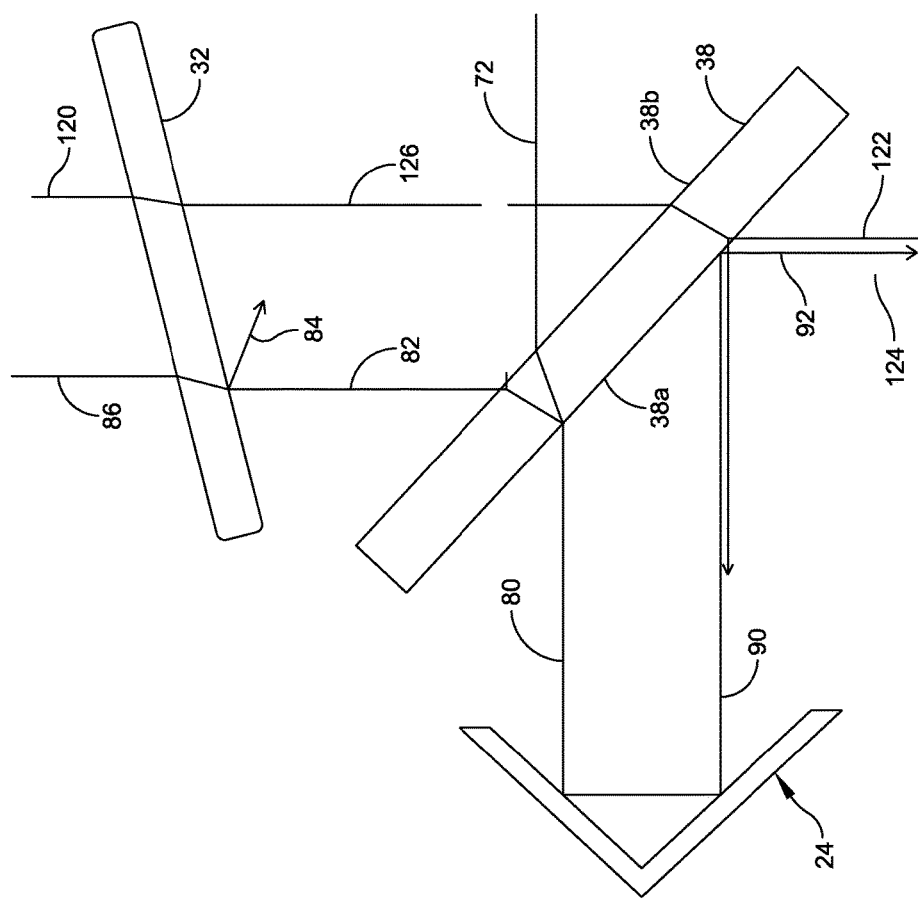
FIG. 12 is a schematic view of the corner cube, the dichroic beam splitter and the exit window of the boresight module.

FIG. 12 illustrates this co-alignment and, specifically, how the mid-wave infrared radiation along path 120 is parallel to the third transmitted laser radiation path 86. As explained above, the first transmitted laser radiation path 72 is parallel with the second transmitted laser radiation along path 80 as the laser radiation emerges from the dichroic beam splitter 38. Also, as explained above, when the laser radiation strikes the corner cube 24, it is reflected antiparallel to its incident direction of travel along path 90. Upon striking the dichroic beam splitter surface 38a, laser radiation strikes the side opposite the side 38a that the laser radiation path 72 struck. As mentioned, the sides 38a, 38b of the dichroic beam splitter 38 are parallel to each other. paths 72, 80, and 90 are parallel to each other upon striking the dichroic beam splitter 38a, and their reflected components must also be parallel as they strike sides of the dichroic beam splitter that are parallel to each other.

As the electromagnetic radiation travels to the collimator 26 and strikes the target 48, the electromagnetic radiation traces back along substantially the same path 122 that the electromagnetic radiation took. The displacement between the path 92 and the path 122 of electromagnetic radiation has been exaggerated in the region 124 to distinguish between the two paths, but the paths are substantially identical. As the electromagnetic radiation along path 122 strikes the dichroic beam splitter 38, the mid-wave infrared portion of the wave passes through the dichroic beam splitter along path 126. Both the laser radiation and the mid-wave radiation strike the exit window 32 and emerge parallel to each other along path 120, such that they are co-aligned with one another as they emerge from the exit window to the cameras 12.

Figure 13:
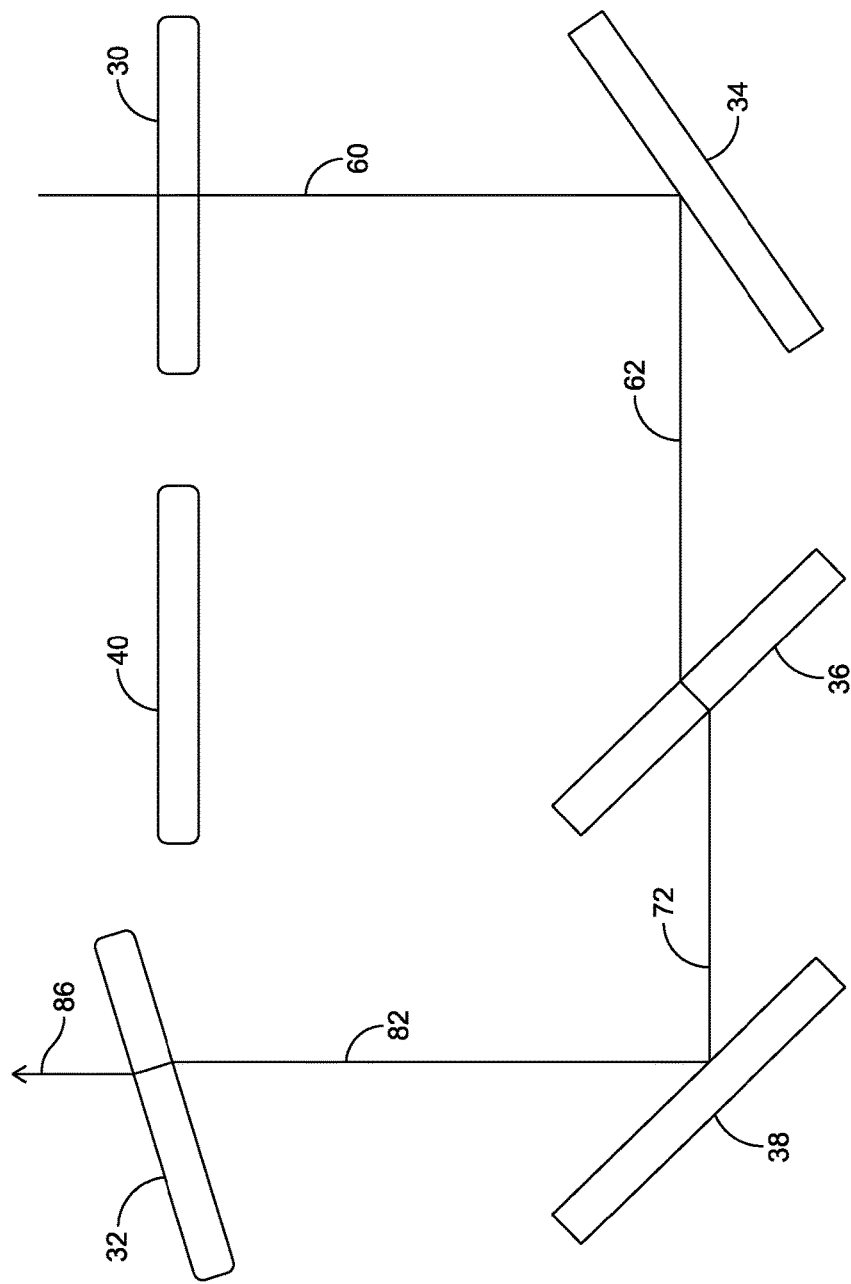
FIG. 13 is a schematic view of the input window, the roof prism, the beam splitter, the beam dump, the dichroic beam splitter and the exit window of the boresight module.

FIG. 13 schematically illustrates the alignment of the incoming electromagnetic radiation that enters the housing 28 of the LTHSR assembly 31 through the input window 30. The path of the incoming electromagnetic radiation is controlled by the steering mirror 16 in the device 14 to be aligned. The electromagnetic radiation enters the input window 30 along path 60, strikes the roof prism 34, and is laterally directed along path 62 through the beam splitter 36 through which part of the electromagnetic radiation emerges parallel to its incident path along path 72. The transmitted portion of the electromagnetic radiation strikes the dichroic beam splitter 38, which is aligned to the roof prism 34 such that the reflected portion of the electromagnetic radiation is antiparallel to the portion of the electromagnetic radiation striking the roof prism. The electromagnetic radiation travels along path 82 to strike the exit window 32 and emerge from the LTHSR housing 28 parallel to its incident path, effectively exiting the LTHSR housing at the same angle by which it entered. Using the shown embodiment, aligning the emerging beam to the incoming beam is possible through alignment within the boresight module 20 disclosed herein. Subsequently, aligning the electromagnetic radiation to the "zero" point on the cameras 12 is then a process of adjusting the incoming the electromagnetic radiation with the aforementioned steering minor 16. If desired, the camera could instead assign a new "zero" point.

Thus, input radiation beam directed to the roof prism 34 of the LTHSR housing 28 is reflected to the dichroic beam splitter 38. A portion of the reflected/transmitted radiation is reflected to the exit widow 32 to the sensor cameras 12, with the remaining reflected/transmitted radiation going to the corner cube 24. The reflected/transmitted radiation reflected from the corner cube 24 travels back to dichroic beam splitter 38, through the 50/50 surface, with transmitted energy some of the reflected energy traveling to the target 48, where energy would preferentially be focused onto the target in the collimator 26. The target 48 absorbs input energy to subsequently emit multiple wavelengths in the visible mid- and long-wave bands as well as re-emitting a small amount of input energy wavelength. The energy emitted from the target 48 passes through dichroic beam splitter 38, with half of the input wavelength being reflected towards corner cube 24 as waste. The visible mid- and long-wave energy, as well as the remaining input wavelength energy, then exits the boresight module 20 through the exit window 32 and onto sensor cameras 12. The exit path of all wavelengths is anti-parallel to the input energy path.

As shown, the arrangement of components of the boresight module is largely symmetrical and uses components that are robust to misalignment. The collimator used in the prototype embodiment has an acceptable field of view of ±0.25 degrees, which allows for slight misalignment of 2-3 milliradians. The preferred embodiment of the boresight module disclosed herein exhibits a resistance to misalignment due to vibration up to 1 milliradian while still operating within the acceptable field of view of the collimator. The preferred embodiment also utilizes substantially thermally insensitive components that will not undergo the process of thermal deformation, a process which potentially causes misalignment.

It should be observed that optical materials and coatings used for the boresight module of embodiments of the present disclosure can be selected based on the portion of the electromagnetic spectrum being utilized.

Other embodiments may include one or more of the following features. The 50/50 surface and AR-coated surfaces on the dichroic beam-splitter may be switched. The 50/50 surface may be slightly different to accommodate a preferential energy path. The collimator may be replaced by either the exit window or the corner cube—this would change the attributes of the device somewhat. A light source may be placed behind the target to back-illuminate the target. A light source may be provided in-place of the target. A Risley pair may be provided at the entrance rather than at the exit. The attenuating beam splitter 36 and dump 30 may be removed for lower energy systems. The beam dump may be replaced by an exit window, which can be used to direct energy to a camera that uses another window. The boresight module may be used for other source-to-camera alignments. For example, if a camera has a diode source that is co-aligned/co-focused with the camera center pixel, then the boresight module can be used to align the diode source to other cameras, which can detect the diode wavelength or one generated by a target material that absorbs that diode wavelength only to emit other wavelength that other cameras can detect.

By using the LTHSR and the corner cube in the shown configuration, these components can move (>30 mrad) without affecting exit angle. Vibration of collimator can result in very close to zero-mean, thereby having little affect on spot centroid as seen by detectors. Thermal shifts of components of the boresight module have negligible effect on collimation of laser spot. For example, the LTHSR varies less than 5 µrad over any 30° C. range. The corner cube varies less than 5 µrad over an entire operational range. Thermal shifts occur over long time periods as compared to the few seconds it takes to perform a complete boresight procedure. "Zero mean" is a statistical term used here to refer to the vibration-induced variance of the angle and position occurring equally around where that variance is zero or nominal.

Total RSS error is expected to be <6 µrad for direct path and <8 µrad for collimated path. Angles and errors of the laser wavelength from the two paths may be correlated and refined. The vibration amplitude can be on the order of several milliradians.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only.

What is claimed is:
1. A boresight module comprising:
   a housing including an input window and an exit window;
   a lateral transfer hollow, dichroic beam splitter, retroreflector (LTHSR) assembly supported by the housing, the LTHSR assembly including a dichroic beam splitter and a roof prism configured to direct electromagnetic radiation from the input window to the dichroic beam splitter, the dichroic beam splitter being set at an angle generally transverse to an angle of the roof prism;
   a corner cube coupled to the housing adjacent to the dichroic beam splitter of the LTHSR assembly, the corner cube being configured to direct electromagnetic radiation from the roof prism via the dichroic beam splitter back to the dichroic beam splitter and then to a collimator,
   the collimator including a collimator housing coupled to the housing and a target supported by the collimator housing, the target being configured to receive electromagnetic radiation from the input window to emit electromagnetic radiation through the exit window, wherein the dichroic beam splitter has one highly-transmissive (HT) surface in all wavelengths and one surface with a 50/50 transmission/reflection for a laser wavelength.

2. The module of claim 1, wherein the LTHSR assembly further includes an attenuating beam splitter disposed between the input window and the dichroic beam splitter.

3. The module of claim 2, wherein the electromagnetic radiation travels through the one of the two beam splitters to the exit window.

4. The module of claim 1, further comprising a first Risley prism pair supported by the housing proximate to the exit window.

5. The module of claim 4, wherein the exit window includes a pair bandpass filters positioned proximate to the first Risley prism pair.

6. The module of claim 4, wherein the collimator further includes a second Risley prism pair supported by the collimator housing.

7. The module of claim 1, further comprising at least one beam dump supported by the housing.

8. The module of claim 1, wherein the corner cube includes at least two mirrors.

9. The module of claim 1, wherein a laser beam enters the input window, travels to one of the two beam splitters, and is received at least in part by a beam dump.

* * * * *

UNITED STATES PATENT AND TRADEMARK OFFICE
CERTIFICATE OF CORRECTION

PATENT NO.         : 10,133,020 B2
APPLICATION NO.    : 14/926201
DATED              : November 20, 2018
INVENTOR(S)        : Steven C. Palomino It is certified that error appears in the above-identified patent and that said Letters Patent is hereby corrected as shown below:

In the Specification

Column 4, Lines 16-21, should read:
A typical lateral transfer hollow retro-reflector ("LTHR") consists of three mirrors, two
in the form of a roof prism and a third positioned away at a right angle to both mirrors in the
roof prism. The LTHSR has an optional attenuator in between and a special dichroic beam splitter in
place of the third mirror.

Column 9, Lines 18-21, should read:
Subsequently, aligning the electromagnetic radiation to the "zero" point on the cameras 12 is
then a process of adjusting the incoming the electromagnetic radiation with the aforementioned
steering mirror 16.

Signed and Sealed this
Fifteenth Day of January, 2019

Andrei Iancu
*Director of the United States Patent and Trademark Office*